United States Patent
Cho et al.

(10) Patent No.: US 11,948,547 B2
(45) Date of Patent: Apr. 2, 2024

(54) INFORMATION QUANTITY-BASED REFERENCE SENSOR SELECTION AND ACTIVE NOISE CONTROL USING THE SAME

(71) Applicants: HYUNDAI MOTOR COMPANY, Seoul (KR); Kia Corporation, Seoul (KR); SEOUL NATIONAL UNIVERSITY R&DB FOUNDATION, Seoul (KR)

(72) Inventors: Mun Hwan Cho, Seoul (KR); Kaang Dok Yee, Yongin-si (KR); Chi Sung Oh, Hwaseong-si (KR); Jung Keun You, Suwon-si (KR); Yun Seol Park, Seoul (KR); Yeon June Kang, Seoul (KR)

(73) Assignees: HYUNDAI MOTOR COMPANY, Seoul (KR); KIA CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/902,375

(22) Filed: Sep. 2, 2022

(65) Prior Publication Data

US 2023/0197052 A1    Jun. 22, 2023

(30) Foreign Application Priority Data

Dec. 17, 2021    (KR) .................... 10-2021-0181773

(51) Int. Cl.
*G10K 11/178*      (2006.01)
*H04B 1/08*        (2006.01)

(52) U.S. Cl.
CPC ...... *G10K 11/1787* (2018.01); *G10K 11/1783* (2018.01); *H04B 1/086* (2013.01)

(58) Field of Classification Search
CPC ............. G10K 11/175; G10K 11/1752; G10K 11/1754; G10K 11/178; G10K 11/1781;
(Continued)

(56) References Cited

U.S. PATENT DOCUMENTS 5,638,304 A * 6/1997 Billoud ............ G10K 11/17857
702/56
5,917,919 A * 6/1999 Rosenthal ........ G10K 11/17879
381/71.11

(Continued)

FOREIGN PATENT DOCUMENTS

CN            110688956 A * 1/2020

OTHER PUBLICATIONS

Kim et al "A Study on Optimal Selection of Reference Accelerometers for Active Road Noise Control", Inter-noise, pp. 1-8, Aug. 26, 2020.*

(Continued)

*Primary Examiner* — Leshui Zhang
(74) *Attorney, Agent, or Firm* — Morgan, Lewis & Bockius LLP

(57) ABSTRACT

An active noise control system selects one reference sensor providing a reference signal with the largest coherence to a noise signal, among a plurality of available reference sensors, as a first entry of a reference sensor set. After selecting the first entry, the active noise control system repeats a process in which a sensor capable of providing the largest information quantity to a current reference sensor set among remaining sensors is selected as a new entry of a reference sensor set, until a desired number of sensors is reached or a desired control level is reached. When the reference sensor set is determined, the active noise control system utilizes the entries of the reference sensor set to generates a noise control signal suitable for canceling the noise signal.

20 Claims, 6 Drawing Sheets

(58) Field of Classification Search
CPC ....... G10K 11/17813; G10K 11/17815; G10K 11/17817; G10K 11/17819; G10K 11/17821; G10K 11/17823; G10K 11/17825; G10K 11/17827; G10K 11/17853; G10K 11/1787; G10K 11/17873; G10K 11/17879; G10K 11/17881; G10K 11/17883; G10K 11/1783; G10K 11/17833; G10K 11/17837; G10K 11/17854; G10K 11/17855; G10K 11/17857; H04R 3/005; G10L 21/0208; G10L 21/0216; H03G 7/002

USPC ..... 381/28, 59, 55, 56, 57, 66, 67, 312–321, 381/74, 72, 26, 71.1–71.13, 83, 86, 332, 381/91, 92, 93, 95, 96, 97, 98, 99, 100, 381/101, 102, 103, 106, 107, 108, 120, 381/121; 704/226, 233, E21.007, E21.02; 700/94; 379/406.01–406.16; 327/551, 327/552, 553, 555, 560

See application file for complete search history.

(56) References Cited

U.S. PATENT DOCUMENTS

| | | | | |
|---|---|---|---|---|
| 7,062,049 | B1* | 6/2006 | Inoue | G10K 11/17857 381/86 |
| 9,437,185 | B2* | 9/2016 | Inoue | G10K 15/02 |
| 10,839,786 | B1* | 11/2020 | Hera | H04R 5/04 |
| 2010/0124337 | A1* | 5/2010 | Wertz | G10K 11/17854 381/71.11 |
| 2013/0343558 | A1* | 12/2013 | Fox | G10L 21/0208 381/71.14 |
| 2015/0063581 | A1* | 3/2015 | Tani | G10K 11/17855 381/71.2 |
| 2016/0071508 | A1* | 3/2016 | Wurm | G10K 11/17817 381/58 |
| 2017/0150256 | A1* | 5/2017 | Christoph | G10L 21/0364 |
| 2017/0330551 | A1* | 11/2017 | Zaferopoulos | G10K 11/17879 |
| 2018/0061392 | A1* | 3/2018 | Oh | G10K 11/17879 |
| 2018/0204561 | A1* | 7/2018 | Goto | G10K 11/17883 |
| 2020/0216093 | A1* | 7/2020 | Lee | G06V 40/70 |

OTHER PUBLICATIONS

Yun Seol Park, "A study on optimal reference sensor placement for active control of road noise based on coherence analysis", Aug. 2021.

* cited by examiner

INFORMATION QUANTITY-BASED REFERENCE SENSOR SELECTION AND ACTIVE NOISE CONTROL USING THE SAME

CROSS-REFERENCE TO RELATED APPLICATIONS

The present application claims priority to Korean Patent Application No. 10-2021-0181773, filed on Dec. 17, 2021, and Korean Patent Application No. 10-2022-0092697, filed on Jul. 26, 2022, the entire contents of which is incorporated herein for all purposes by this reference.

BACKGROUND OF THE PRESENT DISCLOSURE

Field of the Present Disclosure

The present disclosure relates to an active noise control for reducing road noise in a vehicle, and more particularly, to efficient selection of reference sensors that are to be used in an active noise control.

Description of Related Art

The content described in the present section merely provides the background information on the present disclosure and does not form the related art.

Various noises are generated by air or a vehicle structure while the vehicle is running. For example, noise generated by an engine of the vehicle, noise generated by friction between the vehicle and a road, vibration transmitted through a suspension, or wind noise generated by wind may be introduced into a compartment of the vehicle.

A method for reducing the vehicle noise is classified into a passive noise control method of installing a sound absorbing material for absorbing noise in a vehicle, and an active noise control (ANC) method using a noise control signal having a phase opposite to a phase of the noise.

The passive noise control method has a limitation in adaptively removing various noises generated by driving. Accordingly, research on the active noise control method is being actively conducted.

The performance of the active noise control is better as coherence between the reference signal and the noise signal is higher. The combination of appropriate reference signals may vary depending on a position in a vehicle where noise control is desired, the type of noise, vibration characteristics that generate noise, etc. Thus, a noise control system should select the optimal combination of reference signals from a reference signal candidate group in consideration of the types of various noise sources and a noise generation position.

Conventional known reference signal selection techniques take a lot of calculation time or do not guarantee optimal performance. For example, a single coherence (SCOH) technique calculates a SCOH value between each reference signal candidate and a noise signal, for the noise signal which is output from one microphone, and selects a desired number of candidates forming a reference signal set in the order of increasing the SCOH value. The SCOH technique can rapidly select the reference signal set by simplifying required calculation (e.g., 18 SCOH calculations are required for one noise signal and 18 available reference signal candidates), but this excessively simplifies correlation between reference signals, so that the reference signal set selected by the present technique provides low control performance to an ANC system.

A Multiple Coherence (MCOH) technique calculates a MCOH value between each reference signal candidate set and a noise signal, for the noise signal which is output from one microphone, and selects a candidate set having the largest MCOH value as a reference signal set. Although the MCOH technique requires more calculation quantities than the SCOH technique (e.g., for one noise signal and 18 available reference signal candidates, when four reference signals are selected, $_{18}C_4(=3050)$ MCOH calculations are required), it is still possible to select a reference signal set within an allowable time. Although the MCOH technique reflects a complex interrelation between reference signals to some extent as compared to the SCOH technique, control performance provided by the reference signal set having the largest MCOH value to the ANC system is still low.

An Optimal Filter technique calculates an optimal filter for each reference signal candidate set, and selects a candidate set corresponding to the optimal filter providing the largest control quantity as the reference signal set. Because the optimal filter technique is the most accurate performance prediction method, the reference signal set selected by the present technique guarantees the best performance. However, because a large quantity of inverse matrix calculation is required, the optimal filter technique is not suitable for performing in real time in the ANC system implemented in a vehicle.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing efficiently determining optimal reference sensors that are to be used for generating a noise control signal among a plurality of reference sensors mounted on a vehicle generating a reference signal available for active noise control or a combination of optimal reference signals.

The problems to be solved by the present disclosure are not limited to the above-mentioned problems, and other problems which are not mentioned will be clearly understood by those skilled in the art from the following description.

A reference sensor selection technique included in the present disclosure selects one reference sensor providing a reference signal with the largest coherence to a noise signal, among a plurality of available reference sensors, as a first entry of a reference sensor set, and then repeats a process in which a sensor capable of providing the largest information quantity to a current reference sensor set among remaining sensors is selected as a new entry of a reference sensor set, until a desired number of sensors is reached or a desired control level is reached.

To quantify the information quantity of a current reference sensor set, a Fisher Information Matrix (FIM) is introduced. When an i-th sensor is added to the current sensor set based on the information matrix of the current sensor set, a new information quantity (i.e., the new information quantity of the added sensor) which is to be added is defined.

To ensure higher control performance, the provided technique may be combined with an optimal filter technique.

According to an aspect of the present disclosure, an active noise control system can rapidly determine an optimal reference sensor set which is to be used in an active noise control, by selecting a few reference sensor candidates based on a coherence information quantity among a plurality of reference sensors provided in a vehicle, and applying the optimal filter technique to the selected reference sensor candidates.

For example, when four reference sensors are finally selected among a plurality of available reference sensors, 7 reference sensor candidates are selected based on the provided information quantity, and then an optimal filter is determined for each of all combinations selecting four candidates from among 7 candidates. Accordingly, the combination including the best control performance among "$_7C_4$" combinations may be finally determined as optimal reference sensors.

To determine reference sensor candidates, an active noise control system may set a passenger's sitting position(s) as a target zone, obtain a noise signal(s) from a microphone(s) provided in the target zone, and obtain a reference signal detecting vibration introduced from a road from each of sensors provided in a vehicle.

The active noise control system may determine a coherence value between a noise signal and a corresponding reference signal, for each reference sensor, using a correlation function such as Single Coherence (SCOH), Multiple Coherence (MCOH), or Partial Coherence (PCOH). The active noise control system may construct or update the information matrix for a candidate list whenever a reference sensor candidate is added to the list of reference sensor candidates (in brief, candidate list), based on the coherence value determined for each sensor. Here, an information matrix for the candidate list is a matrix indicating a coherence information quantity between noise signals and reference signals corresponding to reference sensor candidates included in the candidate list.

The active noise control system may determine an information quantity which may be additionally provided to a current candidate list by each of remaining reference sensors other than candidates included in a current candidate list among reference sensors available in a vehicle, and may add a reference sensor capable of providing the largest information quantity as a new reference sensor candidate to a current candidate list. The addition of the candidates is repeated until a desired number of reference sensor candidates is determined or until the information quantity of a candidate list reaches a desired level.

If the candidate list is determined, the active noise control system determines an optimal filter for each of subsets of reference sensor candidates included in the candidate list. The active noise control system may determine optimal reference sensors by selecting a subset corresponding to an optimal filter including the best control performance.

The active noise control system may perform an active noise control process including the generation of an optimal noise control signal, using reference signals received from optimal reference sensors. A noise control signal is emitted as an offset sound for noise by at least one speaker in a target zone in a vehicle compartment.

Various aspects of the present disclosure are directed to providing a method for an active noise control of a vehicle. The method includes obtaining a reference signal indicating vibration introduced from a road from each of sensors provided in the vehicle, and obtaining a noise signal indicating indoor noise from at least one microphone positioned in a target zone in a compartment of the vehicle. The method further includes determining a coherence value between the noise signal and a reference signal corresponding to each of the sensors, and selecting a sensor corresponding to a reference signal with a largest coherence value among the plurality of sensors, as a first entry of a candidate list. The method further includes repeating a process in which a sensor adding the largest coherence information quantity to a current candidate list among the plurality of sensors is selected as a new entry of the current candidate list, until a number of entries included in the candidate list reaches a preset number. The method further includes setting a reference sensor set which is to be used in the active noise control using sensors included in the candidate list, when the number of the entries included in the candidate list reaches the preset number. The method further includes generating a noise control signal for the target zone based on reference signals obtained from the reference sensors corresponding to the reference sensor set.

Various aspects of the present disclosure are directed to providing a control device configured for an active noise control of a vehicle. The control device includes a memory and at least one processor. The at least one processor is configured to obtain a reference signal indicating vibration introduced from a road from each of sensors provided in the vehicle, and obtain a noise signal indicating indoor noise from at least one microphone positioned in a target zone in a compartment of the vehicle. The at least one processor is further configured to determine a coherence value between the noise signal and a reference signal corresponding to each of the sensors, and select a sensor corresponding to a reference signal with a largest coherence value among the plurality of sensors, as a first entry of a candidate list. The at least one processor is further configured to repeat a process in which a sensor adding the largest coherence information quantity to a current candidate list among the plurality of sensors is selected as a new entry of the current candidate list, until a number of entries included in the candidate list reaches a preset number. The at least one processor is further configured to set a reference sensor set which is to be used in the active noise control using sensors included in the candidate list, when the number of the entries included in the candidate list reaches the preset number. The at least one processor is further configured to generate a noise control signal for the target zone based on reference signals obtained from the reference sensors corresponding to the reference sensor set.

According to an aspect of the present disclosure, an active noise control system utilizes a reference sensor selection method for expanding entries of a reference sensor set, by selecting a first entry of a reference sensor set to be used in an active noise control based on coherence to reference signals received from reference sensors provided in a vehicle and noise signal(s) received from a target zone in the vehicle, and then repeating a process in which a reference sensor configured for providing the largest coherence information quantity to a current reference sensor set among remaining reference sensors is added. Such a reference sensor selection method can efficiently determine the combination of optimal reference sensors suitable for the active noise control.

According to another aspect of the present disclosure, the active noise control system generates an optimal filter for each of combinations or subset (of a desired number of reference sensor candidates) which may be considered from reference sensor candidates after first selecting a few reference sensor candidates from a set of reference sensors, instead of generating the optimal filter for each of all combinations or all subsets which may be considered from a set of reference sensors, when determining the subset of the reference sensors that are to be used in an active noise control from the set of the reference sensors in the vehicle, so that the optimal reference sensors may be rapidly selected compared to the conventional optimal filter technique.

The provided reference sensor selection method is suitable for performing in real time in an active noise control system implemented in a vehicle where an appropriate active noise control is required according to the riding conditions of passengers and the characteristics of a changing driving road.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
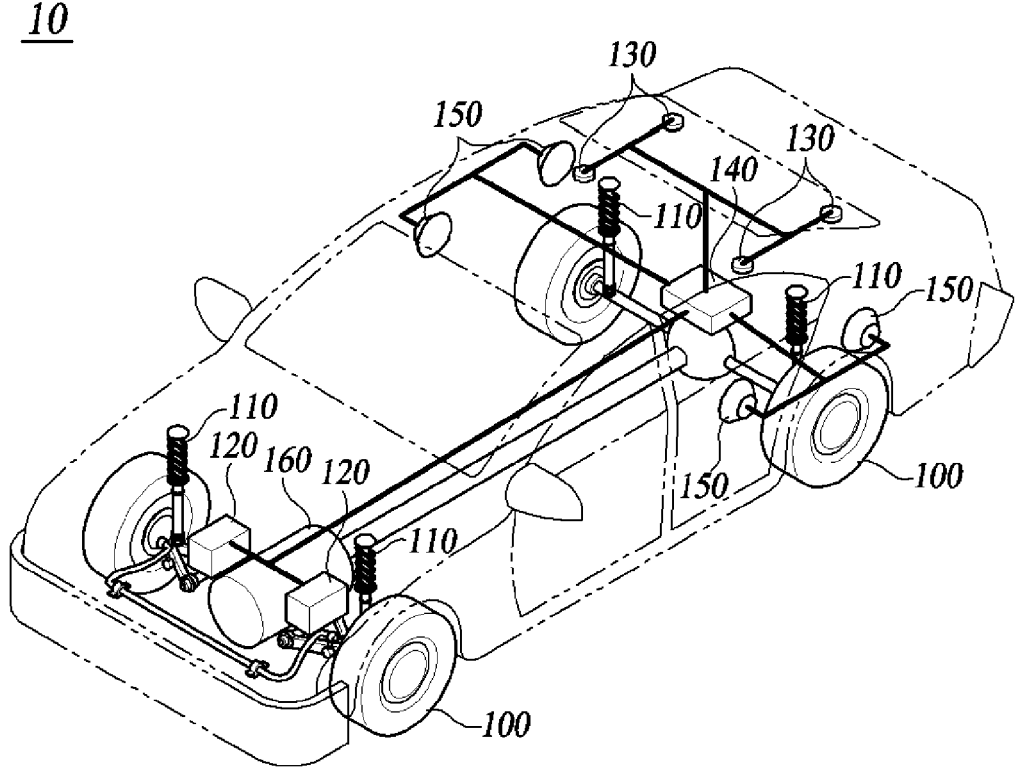
FIG. 1 shows an exemplary vehicle environment in which techniques of the present disclosure may be implemented.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DESCRIPTION OF EMBODIMENTS

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. The same reference numerals are used throughout the drawings to designate the same or similar components. Furthermore, when it is determined that the detailed description of the known art may obscure the gist of the present disclosure, the detailed description will be omitted.

It will be understood that, although the terms "first", "second", etc. may be used herein to describe various elements, these elements should not be limited by these terms. These terms are only used to distinguish one element from another element. It will be further understood that the terms "comprise", "include", "have", etc. When used in the exemplary embodiment, specify the presence of stated features, integers, steps, operations, elements, components, and/or combinations thereof but do not preclude the presence or addition of one or more other features, integers, steps, operations, elements, components, and/or combinations thereof. Furthermore, the terms "unit", "module", etc. described in the exemplary embodiment means a unit that processes at least one function or operation, which may be implemented as hardware or software or a combination of hardware and software.

The detailed description which will be set forth below in conjunction with the accompanying drawings is intended to describe the exemplary embodiment of the present disclosure, and is not intended to represent only an exemplary embodiment in which technologies of the present disclosure may be practiced.

The present disclosure is generally directed to efficiently select reference sensors which will be used in an active noise control for reducing a road noise in a vehicle. The disclosed reference sensor selection technique is a method in which one reference sensor providing a reference signal which is most similar to an indoor noise signal among a plurality of available reference sensors is selected and then the most appropriate reference sensors are additionally selected one by one based on the selected reference sensor until a desired number of sensors is reached or a desired control level is reached. When added to a current sensor set among the available reference sensors, a sensor which can add the largest quantity of information to the current sensor set is selected.

The road noise mainly refers to a vehicle indoor noise generated when vibration generated in tires due to the driving of the vehicle is transmitted to a vehicle body along a vehicle suspension structure. A plurality of reference sensors may be mounted at different positions of structural elements which most contribute to the transmission of the road noise into the vehicle. Although the following description is described on the premise that target noise to be controlled is the road noise, the target noise which may be controlled by an active noise control system and an active noise control method according to various embodiments of the present disclosure is not limited to the road noise.

FIG. 1 shows an exemplary vehicle environment in which techniques of the present disclosure may be implemented. Referring to FIG. 1, a vehicle 10 may include a wheel 100, a suspension 110, an accelerometer 120, a microphone 130, a controller 140, a speaker 150, and an axle 160. The number and positions of a plurality of components shown in FIG. 1 are merely illustrative. In other exemplary embodiments of the present disclosure, some components may be added, changed, or eliminated, and the number and positions of some or all components may also vary.

A chassis of the vehicle 10 includes front wheels which are provided on left and right sides of a front portion of the vehicle 10, and rear wheels which are provided on left and right sides of a rear portion of the vehicle 10. The chassis of the vehicle 10 further includes the axle 160 as a power transmission means. Furthermore, the chassis of the vehicle 10 includes the suspension 110. Furthermore, the vehicle 10 may further include at least one of a power device, a steering device, or a brake device.

The suspension 110 is a device configured for mitigating the vibration or shock of the vehicle 10. To be more specific, vibration caused by a road while the vehicle 10 is driving is applied to the vehicle 10. The suspension 110 mitigates vibration applied to the vehicle 10 using a spring, an air suspension, etc. The suspension 110 can improve the ride comfort of a passenger in the vehicle 10 by mitigating shock.

Although the suspension 110 may mitigate large vibration applied to the vehicle 10, it is difficult to remove fine vibration generated by friction between the wheel 100 and the road. Such a fine vibration generates noise inside the vehicle 10 through the suspension 110.

Moreover, noise generated by friction between the wheel 100 and the road, noise generated by an engine which is the power device, or wind noise generated by wind, etc. may be introduced into the interior of the vehicle 10.

To eliminate the internal noise of the vehicle 10, the vehicle 10 may include an active noise control system. The active noise control system may be integrated with an audio system of the vehicle.

The active noise control system of the vehicle 10 predicts internal noise from the vibration of the vehicle 10, has the same amplitude as the amplitude of a noise signal with respect to the internal noise of the vehicle 10, and generates an offset sound including a phase (i.e., anti-phase) opposite to the phase of the noise signal, thus removing the internal noise of the vehicle 10.

The active noise control system may use the accelerometer 120, the microphone 130, the controller 140, the amplifier (AMP), and the speaker 150 for the active noise control. Although FIG. 1 shows one accelerometer 120, one microphone 130, and speaker 150 for the sake of simplicity, the active noise control system generally utilizes a plurality of accelerometers 120 (e.g., 18 or more), a plurality of speakers 124 (e.g., 4 to 8), and a plurality of microphones 130 (e.g., 4 to 8).

The accelerometer 120 measures the acceleration or vibration of the vehicle 10, and transmits the reference signal indicating an acceleration signal to the controller 140. The reference signal is used to generate a noise control signal.

The accelerometer 120 may measure vibration generated by friction between the wheel 100 and the road. A plurality of accelerometers 120 may be mounted at different positions of structural elements (e.g., suspension 110, or connection mechanism connecting the wheel 100 and the axle 160) which most contribute to transmit the road noise to the interior of the vehicle.

The accelerometer 120 transmits the reference signal which is the analog signal to the controller 140. Otherwise, the accelerometer 120 may convert the reference signal into the digital signal, and transmit the converted digital signal to the controller 140.

To measure the vibration of the vehicle 10, other types of sensors, such as a gyro sensor, a motion sensor, a displacement sensor, or a torque sensor, may be used instead of the accelerometer 120.

The microphone 130 detects a sound in the vehicle 10, and transmits a sound signal to the controller 140. For instance, the microphone 130 may detect a noise in the vehicle 10, and transmit a noise signal to the controller 140.

To be more specific, the microphone 130 may measure the sound pressure of about 20 to 20 kHz, which is the audible frequency band of a human. The audible frequency range of the microphone 130 may become wide or narrow.

In an exemplary embodiment of the present disclosure, the microphone 130 may measure an internal noise generated by friction between the wheel 100 and the road.

In the case where the noise control signal is output to the interior of the vehicle 10, the microphone 130 may output a noise signal (referred to as an error signal or a residual signal) indicating noise remaining in the vehicle 10 in an environment where the internal noise of the vehicle 10 is at least partially cancelled by the offset sound corresponding to the noise control signal. The error signal may be used to generate the noise control signal together with the reference signal. In the present context, the microphone 130 is also referred to as an "error microphone".

When the audio signal is output to the interior of the vehicle 10, the microphone 130 may measure the error signal and the audio signal together.

The microphone 130 may be positioned at a headrest of a seat, a headliner of the vehicle 10, or anywhere else inside the vehicle 10 suitable for sensing noise that a passenger will hear. A plurality of microphones 130 may be provided at different positions, and be provided in a form of a microphone array.

The controller 120 may determine coefficients of an adaptive filter (referred to as a W-filter) based on error signal(s) and reference signal(s) according to an algorithm such as least mean square (LMS) or filtered-x least mean square (FxLMS), which is well known to those skilled in the art. The noise control signal may be generated by the adaptive filter based on the reference signal or the combination of reference signals. When the noise control signal passes through the amplifier and is played through the speaker 150, the offset sound which is substantially opposite in phase and is equal in magnitude to the road noise which is heard by a passenger in a vehicle compartment has an ideal waveform to be generated near to the passenger's ear and the microphone 130. The offset sound from the speaker 150 may meet the road noise in the vicinity of the microphone 130 in the vehicle compartment to lower a sound pressure level due to the road noise at the present position.

The amplifier receives the noise control signal from the controller 140, and receives the audio signal from an Audio, Video, and Navigation (AVN) device.

The amplifier may mix the noise control signal and the audio signal, and output the mixed signal through the speaker. Furthermore, the amplifier may adjust the amplitude of the mixed signal using the amplifiers. The amplifiers may include a vacuum tube or a transistor for amplifying the power of the mixed signal.

The amplifier transmits the mixed signal to the speaker 150.

The speaker 150 receives the mixed signal which is an electric signal from the amplifier, and outputs the mixed signal to the interior of the vehicle 10 in a form of a sound wave. The noise in the vehicle 10 may be reduced or removed by outputting the mixed signal.

The speakers 150 may be provided at a plurality of positions in the vehicle 10.

The speaker 150 may output the mixed signal to only a specific passenger as necessary. To be more specific, the speaker 150 may cause constructive interference at a specific passenger's ear position by outputting different phases of mixed signals at a plurality of positions.

Figure 2:
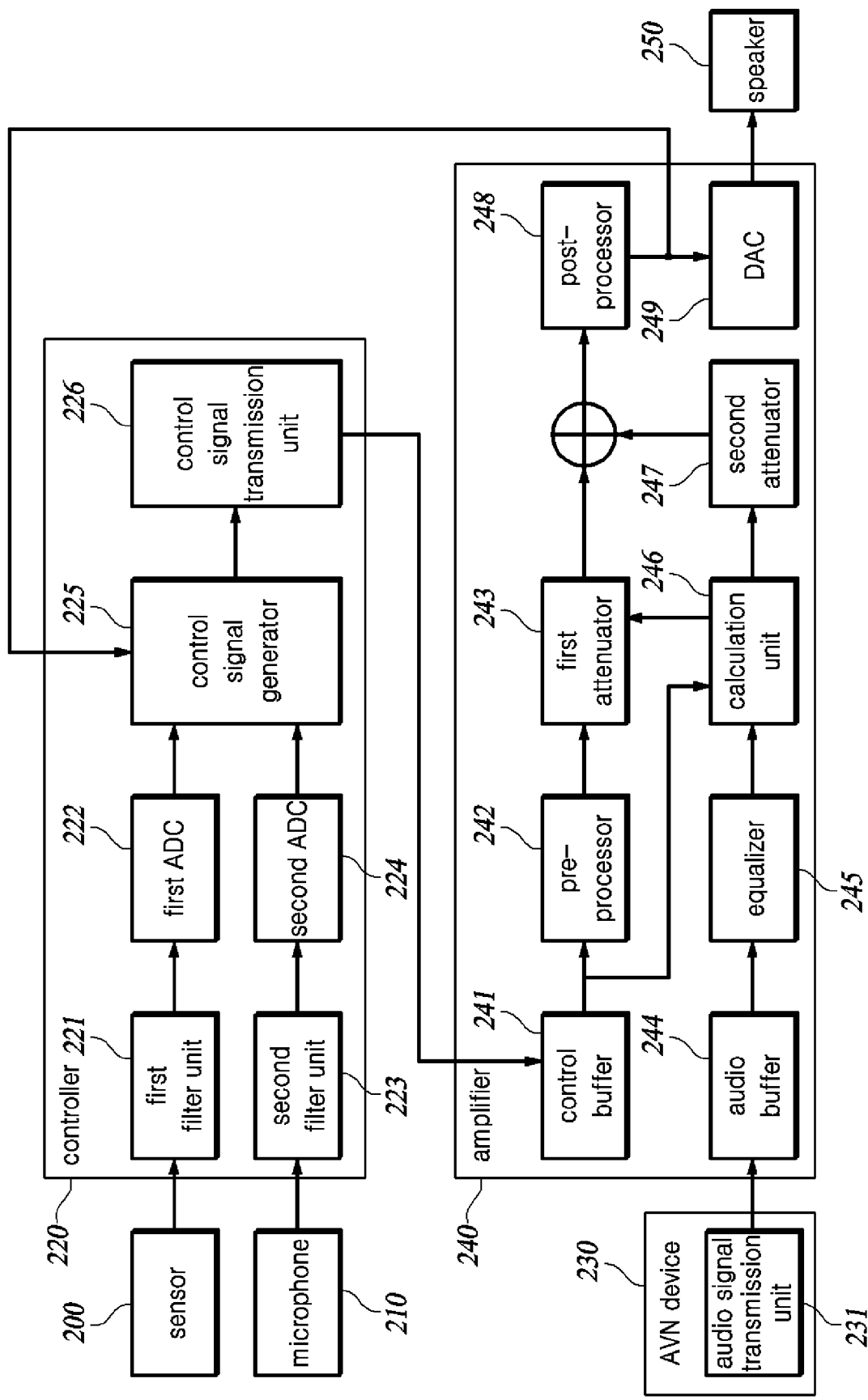
FIG. 2 is a block diagram illustrating components of an active noise control system of a vehicle according to an exemplary embodiment of the present disclosure.

FIG. 2 is a block diagram illustrating components of an active noise control system of a vehicle according to an exemplary embodiment of the present disclosure.

Referring to FIG. 2, the active noise control system of the vehicle includes a reference sensor 200, a microphone 210, a controller 220, an Audio, Video and Navigation (AVN) device 230, an amplifier 240, and a speaker 250. The reference sensor 200, the microphone 210, the controller 220, the AVN device 230, the amplifier 240, and the speaker 250 in FIG. 2 may correspond to the accelerometer 120, the microphone 130, the controller 140, the AVN device, the amplifier, and the speaker 150 described with reference to FIG. 1, respectively.

The reference sensor 200 measures vibration inducing the internal noise of the vehicle, and then outputs the reference signal indicating the vibration. The reference sensor 200 may include at least one of the acceleration sensor, the gyro sensor, the motion sensor, the displacement sensor or the torque sensor.

The microphone 210 measures the internal noise of the vehicle and then outputs the noise signal indicating the internal noise. When the noise control signal is output to the interior of the vehicle, the microphone 210 may output the noise signal (also referred to as the error signal or the residual signal) indicating the noise remaining in the vehicle. When the audio signal is output to the interior of the vehicle, the microphone 130 may measure the error signal and the audio signal together.

The controller 220 generates the noise control signal according to the reference signal. The noise control signal is a signal that has the same magnitude as that of the internal noise of the vehicle, and has a phase opposite to the phase of the internal noise. In the case of outputting the noise control signal, the controller 220 may generate the noise control signal based on the reference signal and the error signal. When the audio signal is being output, the controller 220 may extract the error signal from a sound signal measured by the microphone 210, and generate the noise control signal based on the reference signal and the error signal.

The controller 220 may independently output the noise control signal regardless of whether the audio function of the AVN device 230 is operated. In other words, the controller 220 may be always operated when the vehicle is driving. The controller 220 may output the noise control signal and the audio signal together, when the audio function of the AVN device 230 is turned on. The controller 220 may output only the noise control signal, when the audio function of the AVN device 230 is turned off.

The controller 220 may be connected to other components of the active noise control system via an A2B (Automotive Audio Bus) interface.

Meanwhile, the AVN device 230 is provided in the vehicle to execute audio, video and navigation programs according to the request of the passenger.

To be more specific, the AVN device 230 may transmit the audio signal to the amplifier 240 using an audio signal transmission unit 231. The audio signal transmitted to the amplifier 240 is output through the speaker 250 to the interior of the vehicle. For instance, when the AVN device 230 transmits the audio signal related to music to the amplifier 240 under the control of the passenger, the amplifier 240 and the speaker 250 may play music in response to the audio signal. Furthermore, the AVN device 230 may provide driving information of the vehicle, road information, or navigation information to the passenger using a video output device such as a display.

The AVN device 230 may communicate with an external device using a communication network that supports mobile communication standards such as 3G (Generation), Long Term Evolution (LTE), or 5G. The AVN device 230 may receive information of surrounding vehicles, infrastructure information, road information, traffic information, and the like through communication.

The amplifier 240 mixes the noise control signal and the audio signal, processes the mixed signal, and outputs the processed signal through the speaker 250. The amplifier 240 may perform mixing after processing the noise control signal or processing the audio signal.

The amplifier 240 may appropriately process the mixed signal in consideration of the characteristics of the noise control signal, the characteristics of the audio signal, or the characteristics of the speaker 250. For instance, the amplifier 240 may adjust the size of the mixed signal. To the present end, the amplifier 240 may include at least one amplifier.

The amplifier 240 may feed the processed signal back to the controller 220. The controller 220 may generate the noise control signal for removing only the error signal among various sounds in the vehicle using the processed signal.

The speaker 250 receives the processed signal from the amplifier 240, and outputs the processed signal to the interior of the vehicle. The internal noise of the vehicle may be eliminated or attenuated by the output of the speaker 250.

Hereinafter, the components of the controller 220 and the amplifier 240 will be described in detail.

The controller 220 includes at least one of a first filter unit 221, a first ADC (Analog-Digital Converter) 222, a second filter unit 223, a second ADC 224, a control signal generator 225 or a control signal transmission unit 226. The controller 220 may be implemented with at least one digital signal processor (DSP).

The first filter unit 221 filters the reference signal of the reference sensor 200. The first filter unit 221 may filter a signal of a specific band among the frequency bands of the reference signal. For instance, to filter the reference signal of the low frequency band which is a main noise cause in the vehicle, the first filter unit 221 may apply a low pass filter to the reference signal. Furthermore, the first filter unit 221 may apply a high pass filter to the reference signal.

The first ADC converter 222 converts the reference signal which is the analog signal into the digital signal. To be more specific, the first ADC converter 222 may convert the reference signal filtered by the first filter unit 221 into the digital signal. To the present end, the first ADC converter 222 may perform sampling on the reference signal. For instance, the first ADC converter 222 may sample the reference signal at the sampling rate of 2 kHz. In other words, the first ADC converter 222 may apply downsampling to the noise control signal. The first ADC converter 222 may convert the reference signal which is the analog signal into the digital signal, by sampling the reference signal at an appropriate sampling rate.

The second filter unit 223 filters the noise signal or error signal of the microphone 210. The second filter unit 223 may filter the signal of the specific band among the frequency band of the noise signal or the error signal. For instance, to filter the error signal of the low frequency band, the second filter unit 223 may apply the low pass filter to the error signal. Furthermore, the second filter unit 223 may apply a high pass filter or a notch filter to the error signal.

The second ADC converter 224 converts the noise signal or the error signal which is the analog signal into the digital signal. To be more specific, the second ADC converter 224 may convert the noise signal or the error signal filtered by the second filter unit 223 into the digital signal. To the present end, the second ADC converter 224 may perform sampling on the error signal. For instance, the second ADC converter 224 may sample the error signal at the sampling rate of 2 kHz. In other words, the second ADC converter 224 may apply down-sampling to the error signal. The second ADC converter 224 may convert the error signal which is the analog signal into the digital signal, by sampling the error signal at an appropriate sampling rate. Subsequently, the error signal converted into the digital signal may be filtered by the high pass filter.

The control signal generator 225 generates the noise control signal based on the reference signal converted into the digital signal. The control signal generator 225 may generate the noise control signal, based on the error signal converted into the digital signal.

The control signal generator 225 may receive a feedback signal processed by the amplifier 240, and may generate a noise control signal that does not affect the output of the audio signal in consideration of the processed signal of the amplifier 240. To be more specific, the microphone 210 may measure the error signal and the audio signal together. At the instant time, the control signal generator 225 may extract the error signal using the processed signal of the amplifier 240, and may generate the noise control signal based on the extracted error signal and reference signal. The generated noise control signal eliminates the noise in the vehicle, but does not attenuate the audio signal.

The control signal transmission unit 226 transmits the noise control signal generated by the control signal generator 225 to the amplifier 240.

The amplifier 240 includes at least one of a control buffer 241, a pre-processor 242, a first attenuator 243, an audio buffer 244, an equalizer 245, a calculation unit 246, a second attenuator 247, a post-processor 248, or a Digital-Analog Converter (DAC) 249. The amplifier 240 may be implemented using at least one digital signal processor.

The control buffer 241 temporarily stores the noise control signal received from the controller 220. When the cumulative number of the noise control signal satisfies a predetermined condition, the control buffer 241 may transmit the noise control signal. Otherwise, the control buffer 241 may store the noise control signal, and transmit the noise control signal at regular time intervals. The control buffer 241 transmits the noise control signal to the pre-processor 242 and the calculation unit 246.

The pre-processor 242 applies up-sampling or filtering on the noise control signal received from the control buffer 241. For instance, the pre-processor 242 may up-sample the sampling rate of the noise control signal to 48 kHz. The pre-processor 242 may improve the control precision of the noise control signal through the up-sampling. Furthermore, when a noise is included in the noise control signal received from the controller 220, the pre-processor 242 may eliminate the noise of the noise control signal through frequency filtering. The pre-processor 242 transmits the pre-processed noise control signal to the first attenuator 243.

The audio buffer 244 temporarily stores the audio signal received from the AVN device 230. When the cumulative number of the audio signal satisfies a predetermined condition, the audio buffer 244 may transmit the audio signal. Otherwise, the audio buffer 244 may store the audio signal, and transmit the audio signal at regular time intervals. The audio buffer 244 transmits the audio signal to the equalizer 245.

The equalizer 245 adjusts the audio signal for each frequency band. The equalizer 245 may divide the frequency band of the audio signal into a plurality of frequency bands, and may adjust the amplitude or phase of the audio signals corresponding to each frequency band. For instance, the equalizer 245 may emphasize the audio signal of the low frequency band, and weakly adjust the audio signal of the high frequency band. The equalizer 245 may adjust the audio signal under the control of the passenger. The equalizer 245 transmits the adjusted audio signal to the calculation unit 246.

The calculation unit 246 determines a control parameter based on the noise control signal received from the control buffer 241 and the audio signal received from the equalizer 245.

The calculation unit 246 may determine control parameters based on a relationship between the noise control signal and the audio signal, the characteristics of the speaker 250, the characteristics of the noise signal, or the characteristics of the error signal.

The control parameters may include a first attenuation coefficient for the noise control signal or a second attenuation coefficient for the audio signal. Furthermore, the control parameters may include boundary values for the range of the noise control signal or the range of the audio signal. Furthermore, the control parameters may include various parameter values for the active noise control.

The first attenuator 243 applies the first attenuation coefficient determined by the calculation unit 246 to the noise control signal, and transmits the attenuated noise control signal to the post-processor 248. When the first attenuation coefficient is not determined by the calculation unit 246, the first attenuator 243 makes the noise control signal pass.

The second attenuator 247 applies the second attenuation coefficient determined by the calculation unit 246 to the audio signal, and transmits the attenuated audio signal to the post-processor 248. When the second attenuation coefficient is not determined by the calculation unit 246, the second attenuator 247 makes the audio signal pass.

The noise control signal and the audio signal are mixed while being transmitted to the post-processor 248. That is, the mixed signal is input into the post-processor 248.

The post-processor 248 performs at least one of linearization or stabilization for the mixed signal. Here, the linearization and the stabilization are intended to post-process the mixed signal based on the mixed signal of the speaker 250 and a displacement limit.

The DAC 249 converts the post-processed signal which is the digital signal into an output signal which is the analog signal. The DAC 249 transmits the output signal to the speaker 250.

The speaker 250 outputs the output signal received from the DAC 249 in a form of the sound wave. The speaker 250 may output the output signal to the interior of the vehicle. The output signal may eliminate the internal noise of the vehicle, and may output an audio according to the audio signal to the interior of the vehicle.

As described above, the present disclosure generally relates to technology for efficiently determining a subset (or combination) of optimal reference sensors that are to be used in the active noise control from a set of a plurality of reference sensors mounted on the vehicle. Therefore, the techniques described below may be used or implemented in the active noise control system of FIG. 2 that performs the active noise control using the combination of the reference sensors.

The active noise control system may determine, from the plurality of reference sensors provided in the vehicle, the optimal combination of reference sensors corresponding to a current sitting arrangement and/or the characteristics of a road on which the vehicle runs.

The active noise control system may obtain reference signals from the plurality of reference sensors provided in the vehicle, and obtain a noise signal from at least one microphone (referred to as an "error microphone") provided in a target zone in the compartment of the vehicle. In the active noise control for the road noise, the reference sensors may be mounted on positions such as a suspension or a vehicle body in consideration of the generation characteristics (e.g., a vibration transmission path, etc.) of road noise. At least one microphone may be provided in a headrest of each seat in the compartment, and a pair of microphones may be typically provided to correspond to the positions of left and right ears of a passenger. Thus, one or two noise signals may be obtained, respectively, for at least one target zone (also referred to as a "quiet zone") in which noise control is required. For example, when four seats are present in the vehicle, a maximum of 8 noise signals may be obtained.

Figure 3A:
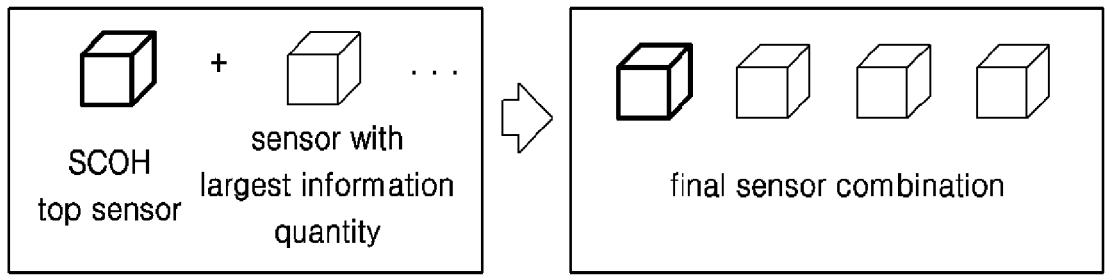
FIG. 3A and FIG. 3B are a conceptual diagram illustrating a reference sensor selection technique according to an aspect of the present disclosure.
Figure 3B:
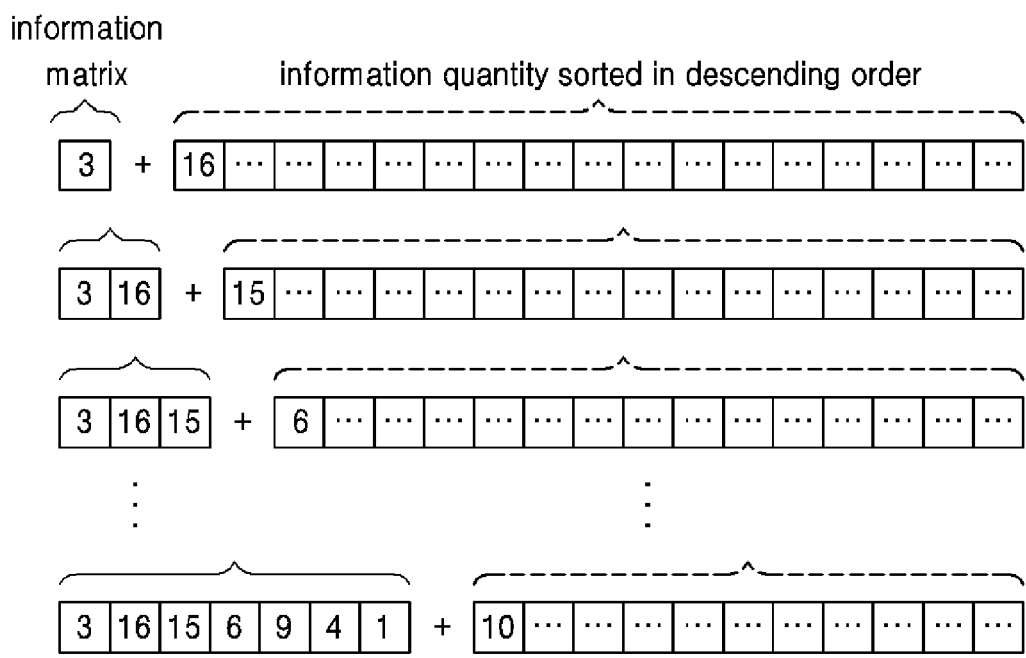

FIG. 3A and FIG. 3B are a conceptual diagram illustrating a reference sensor selection technique according to an aspect of the present disclosure.

According to an exemplary embodiment of the present disclosure, the active noise control system selects one reference sensor providing the reference signal with the largest coherence to the noise signal, among a plurality of available reference sensors, as a first entry of the reference sensor set, and then repeats a process in which a sensor providing the largest information quantity to a current reference sensor set among remaining sensors is selected as a new entry of a reference sensor set, until a desired number of sensors is reached or a desired control level is reached.

The active noise control system may determine a coherence value to the noise signal for each reference signal using the coherence function, and determine the sensor corresponding to the reference signal of the largest coherence value (i.e., closest to 1) as the first entry (i.e., the first reference sensor) of the reference sensor set. The reference sensor set having only the first entry may be referred to as an "initial reference sensor set". The coherence function used to determine the first entry may be a Single Coherence (SCOH) function. The SCOH function represents a correlation between one input and one output in a frequency domain, and is expressed as Equation 1.

$$\gamma_{xy}^2(f) = \frac{|S_{xy}(f)|^2}{S_{xx}(f)S_{yy}(f)} \qquad \text{[Equation 1]}$$

where x represents a single input (i.e., reference signal), y represents a single output (i.e., noise signal), spectral density functions $S_{xx}$ and $S_{yy}$ represent the Fourier transform of the auto-correlation function, and a spectral density function $S_{xy}$ represents the Fourier transform of a cross-correlation function.

The SCOH for the i-th input (i.e., i-th reference signal) and the j-th output (i.e., j-th noise signal) may be expressed as Equation 2.

$$\gamma_{x_i y_j}^2(f) = \frac{|S_{x_i y_j}(f)|^2}{S_{x_i x_i}(f) S_{y_j y_j}(f)} \qquad \text{[Equation 2]}$$

When a plurality of noise signals are obtained, the final SCOH of the i-th input (i.e., i-th reference signal) may be derived by averaging a plurality of $\gamma_{x_i y_j}^2(f)$ obtained from Equation 2 for each frequency. For example, the final SCOH of the i-th reference signal for eight noise signals may be expressed as Equation 3.

$$\gamma_{x_i y}^2(f) = \frac{\sum_{j=1}^{8} \gamma_{x_i y_j}^2(f)}{8} \qquad \text{[Equation 3]}$$

As described above, after the "initial reference sensor set" is determined, the active noise control system repeatedly performs a process in which a sensor capable of providing the largest information quantity to the reference sensor set among remaining sensors is selected as the new entry of the reference sensor set and the number of entries of the reference sensor set is increased.

To quantify the information quantity of the reference sensor set, an information matrix is introduced. When the i-th sensor is added to the current reference sensor set based on the information matrix of the current reference sensor set, a new information quantity (i.e., the new information quantity of the i-th sensor) which is to be added to the information matrix is defined.

Whenever the process of selecting the new entry of the reference sensor set is repeated, the active noise control system constructs the information matrix for the updated reference sensor set. The initial reference sensor set has only one entry (corresponding to one reference sensor having the largest SCOH value), but the entry of the reference sensor set is increased one by one each time the process is repeated. Accordingly, the information matrix is also updated. The information matrix represents the coherence information quantity between the noise signal and the reference signals corresponding to the reference sensor included in the reference sensor set.

In an example shown in FIG. 3A and FIG. 3B, a reference sensor No. 3 with the largest SCOH is first selected (see FIG. 3A), and then new reference sensors are sequentially selected, in the order of No. 16, No. 15, No. 6 . . . , by repeating a process in which the number of entries of the reference sensor set is increased (see FIG. 3B). The information matrix for the initial reference sensor set represents the coherence information quantity of only the reference sensor No. 3. A reference sensor No. 16 which is the sensor capable of providing the largest information quantity to the initial reference sensor set is selected for the next iteration. In the second iteration, the reference sensor set has the reference sensor No. 3 and the reference sensor No. 16, so that the information matrix for the reference sensor set represents the coherence information quantity of these two reference sensors.

The information matrix for the reference sensor set may be constructed based on the Fisher Information Matrix (FIM). The Fisher Information Matrix for the reference sensor set may be expressed as Equation 4.

$$Q = \varphi^T \varphi \quad \text{[Equation 4]}$$

where Q represents the Fisher Information Matrix, and φ represents a correlation function between the noise signal of the microphone and the reference signal of each reference sensor included in the reference sensor set in a frequency band of interest (e.g., 65 to 125 Hz). Here, the correlation function may use a correlation function such as Single Coherence (SCOH), Multiple Coherence (MCOH), or Partial Coherence (PCOH). The MCOH is a function expressing a correlation between a plurality of inputs and one output in the frequency domain. The PCOH is a function expressing a correlation between one input and one output in the frequency domain by removing correlation components between inputs.

The active noise control system may determine a sensor capable of providing the largest information quantity to the current reference sensor set, among the remaining reference sensors which are not included in the current reference sensor set yet, as a new entry which is to be added to the current reference sensor set. To the present end, the active noise control system may determine an additional information quantity (i.e., a new information quantity possessed by an associated sensor as compared to the current reference sensor set) to which the associated sensor may additionally provide when added as a new entry to the current reference sensor set, for each of the remaining reference sensors. The additional information quantity may be determined using the coherence function between the reference signal of the new sensor and the noise signal and the information matrix for the current reference sensor set. For instance, the additional information quantity may be determined using the following Equation 5.

$$\text{Inf}_i^+ = \det(I + \varphi_i Q_o^{-1} \varphi_i^T) \quad \text{[Equation 5]}$$

where $\text{Inf}_i^+$ means an additional information quantity (namely, the new information quantity possessed by the i-th reference sensor as compared to a current candidate list) added to the current reference sensor set, as the i-th reference sensor is added to the current reference sensor set, $\varphi_i$ means a coherence function between the reference signal of the i-th reference sensor and noise signal(s), defined as Equation 3, and $Q_0$ means the information matrix for the current reference sensor set.

The active noise control system may determine an additional information quantity for each of the remaining reference sensors which are not included in the current reference sensor set yet, and may sort reference sensors in a descending order based on the additional information quantity. The active noise control system may add a reference sensor corresponding to the largest additional information quantity to the reference sensor set as a new entry.

If the entry (i.e., the number of selected reference sensors) of the reference sensor set reaches a desired number, the reference sensor set may be determined. The active noise control system may initiate the active noise control process including the generation of the noise control signal suitable for cancelling the noise signal using the reference sensors of the determined reference sensor set.

If a predetermined control performance level is not achieved using the reference sensors of the determined reference sensor set, the active noise control system may further perform a process of selecting the sensor capable of providing the largest information quantity to the determined reference sensor set as the new entry of the reference sensor set, so that the number of entries of the reference sensor set may be further increased.

Figure 4A:
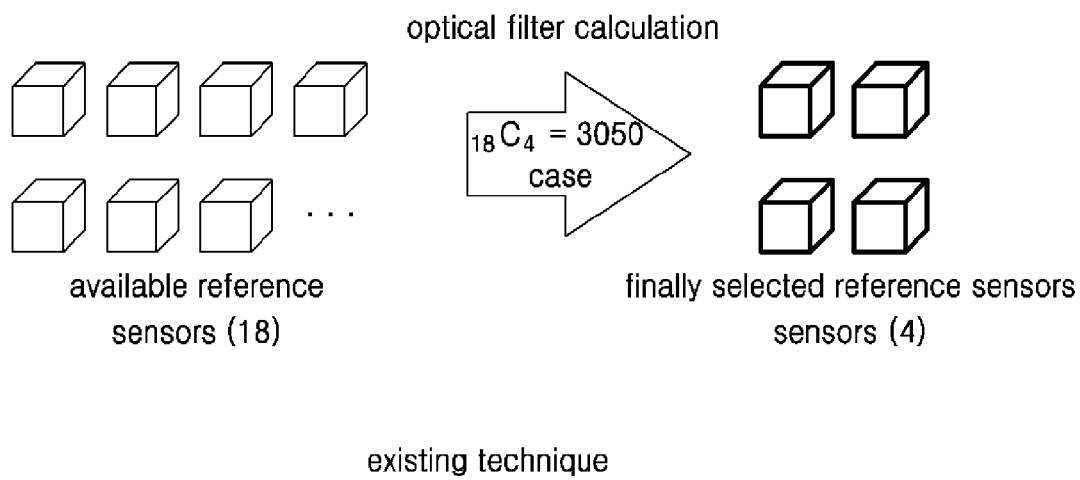
FIG. 4A is a conceptual diagram illustrating a reference sensor selection technique according to a conventional optimal filter technique.
Figure 4B:
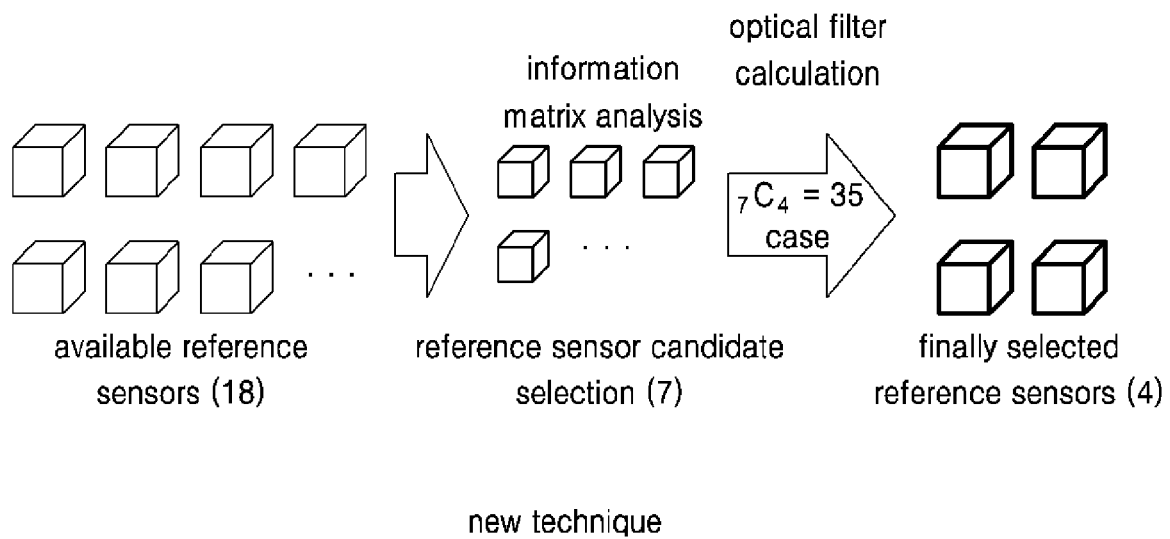
FIG. 4B are a conceptual diagram illustrating a reference sensor selection technique according to another aspect of the present disclosure.

FIG. 4 is a conceptual diagram illustrating a reference sensor selection technique according to another aspect of the present disclosure, compared to a conventional optimal filter technique.

To ensure higher control performance, the above-described reference sensor selection technique may be combined with the optimal filter technique. According to various exemplary embodiments of the present disclosure, the active noise control system may use the optimal filter technique to determine optimal reference sensors from reference sensor candidates selected based on the information quantity. To be more specific, the active noise control system may rapidly determine the optimal reference sensor set which is to be used in the active noise control, by selecting a few reference sensor candidates based on the coherence information quantity among a plurality of reference sensors provided in the vehicle, and applying the optimal filter technique to the selected reference sensor candidates. For example, K optimal reference sensors may be determined based on the optimal filter technique, from M reference sensor candidates selected based on the information quantity.

The active noise control system may perform simulation determining the optimal filter (W-filter) for each of subsets or combinations of K reference sensors which may be considered from M reference sensor candidates. The optimal filter is a set of filter values predicted to achieve the maximum active noise control performance for a provided subset of reference sensors and the noise signal. As described above, the optimal filter may be determined according to an algorithm such as Filtered-x least mean square (FxLMS).

The number of subsets including K reference sensors, which may be considered from M reference sensor candidates, is $_MC_K$. For example, the number of combinations of four reference sensors, which may be considered from 7 reference sensor candidates, is $_7C_4$. Based on the optimal filter determined for each subset or each combination, the active noise control system may determine a subset corresponding to the optimal filter including the best performance as optimal reference sensors.

In the present exemplary embodiment of the present disclosure, since the active noise control system first selects a few reference sensor candidates from among a plurality of reference sensors based on the information quantity, and then determines (or simulates) the optimal filter for each subset of reference sensor candidates to determine the optimal reference sensors capable of providing the optimal control performance among the reference sensor candidates, the optimal reference sensor may be rapidly selected compared to the conventional optimal filter technique. For example, as shown in FIG. 4, when the number of available sensors is 18, the number of reference sensor candidates is 7, and the number of optimal reference sensors is 4, the conventional optimal filter technique requires the optimal filter calculation for each $_{18}C_4$ (=3050) case, whereas the reference sensor selection method according to an exemplary embodiment of the present disclosure requires only the optimal filter calculation for each $_7C_4$ (=35) case.

Figure 5:
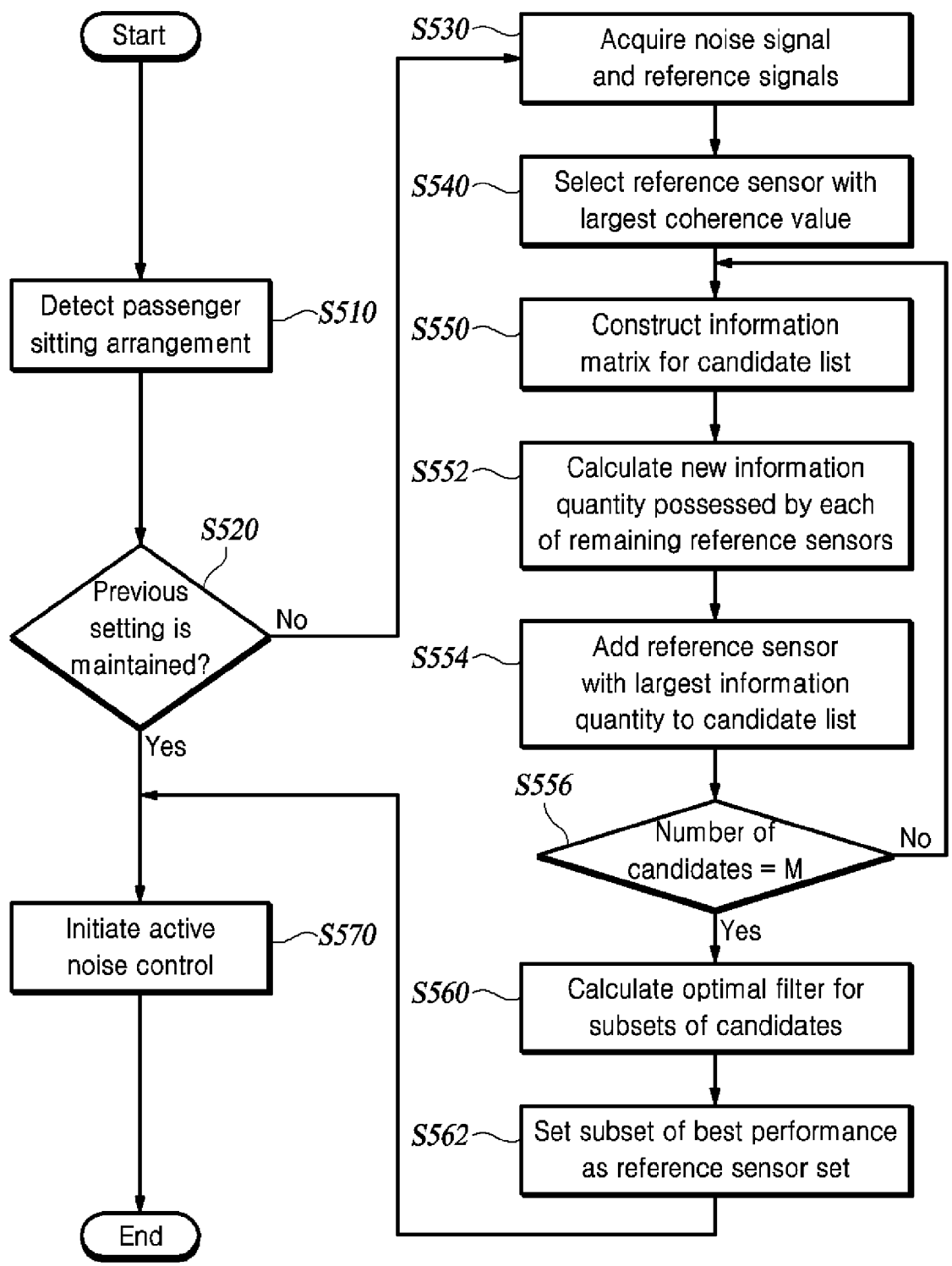
FIG. 5 is a flowchart illustrating a method performed by an active noise control system mounted on a vehicle, according to an exemplary embodiment of the present disclosure.

FIG. 5 is a flowchart illustrating a method performed by an active noise control system mounted on a vehicle, according to an exemplary embodiment of the present disclosure.

If the active noise control function is activated, the active noise control system may first determine a sitting arrangement indicating a state in which passengers sit on the seats in the vehicle (S510). To the present end, the active noise control system may detect the passenger's sitting state in the vehicle using at least one vision sensor that captures the seats or at least one pressure sensor mounted on each seat.

The active noise control system may determine whether previous setting or default setting is maintained for the active noise control, based on the current sitting arrangement (S520). For example, when the current sitting arrangement is equal to the previous arrangement detected in the previous active noise control process, the active noise control system may determine to maintain the previous setting. As an exemplary embodiment of the present disclosure, when the current sitting arrangement is equal to a predefined default arrangement, the active noise control system may determine to maintain the default setting. When the current sitting arrangement is different from the previous arrangement or the default arrangement, the active noise control system may determine that a new setting is required.

The previous setting or the default setting may include the combination or subset of reference sensors, which is set or predefined for the active noise control. The previous setting or the default setting may further include settings for various parameters (e.g., the number of reference signals, the target zone, the noise control level, etc.) used for the active noise control process. The default setting may include parameters for performing the noise control at a uniform level for all seats or parameters for performing the noise control at an optimal level only for a driver's seat.

When it is determined to maintain the previous setting or the default setting ("Yes" in S510), the active noise control system may initiate the active noise control process using a previous combination or a default combination without determining a new combination of the reference sensors (S570).

When it is determined that the previous setting is not maintained ("No" in S510), it is required to determine a new combination of reference sensors suitable for the current sitting arrangement or the current target zone.

To the present end, the active noise control system may set at least one target zone corresponding to a passenger's sitting position in which noise control is required, obtain reference signals from a plurality of reference sensors provided in the vehicle, and obtain the noise signal from at least one microphone provided in the target zone in the compartment of the vehicle (S530).

The active noise control system may determine a coherence value to the noise signal for each reference signal using the coherence function, and determine the sensor corresponding to the reference signal of the largest coherence value (i.e., including a coherence value closest to 1) as the first entry (i.e., the first reference sensor candidate) of the reference sensor candidate list (S540).

After the first entry of the candidate list is determined, the active noise control system repeats a process in which the reference sensor capable of providing the largest coherence information quantity to the current candidate list, among the remaining reference sensors which are not included in the current candidate list yet, is added to the current candidate list, thus expanding the entries of the candidate list.

To the present end, the active noise control system may construct the information matrix for the current reference sensor candidate list (S550). The active noise control system may determine an additional information quantity (i.e., a new information quantity possessed by an associated sensor as compared to the current candidate list) which may be additionally provided by an associated sensor when added to the current candidate list as the new candidate, for each of the remaining reference sensors (S552). The additional information quantity may be determined using the coherence function between the reference signal of the new sensor and the noise signal and the information matrix for the current candidate list. The active noise control system may sort the remaining reference sensors in a descending order based on the additional information quantity. The active noise control system may add a reference sensor corresponding to the largest additional information quantity to a current candidate list as a new reference sensor candidate, and update the candidate list (S554).

After the new reference sensor candidate is added to the candidate list, the active noise control system may repeatedly perform steps S550 to S554 until the number of reference sensor candidates selected so far reaches a preset number (M) of sensors. A preset number of sensors may vary depending on the sitting arrangement. For example, when comparing a case having only a driver with a case having a passenger as well as a driver, the latter may select more reference sensor candidates.

The active noise control system may determine the subset of reference sensors which are to be used in the active noise control, by applying the optimal filter technique to the reference sensor candidates included in the candidate list (S560 to S562), if the number of entries (i.e., reference sensor candidates) included in the updated candidate list reaches a preset number of sensors ("Yes" in S556). For example, K reference sensors may be determined based on the optimal filter technique, from M reference sensor candidates included in the candidate list.

The active noise control system may perform simulation calculating the optimal filter (W-filter) for each of subsets or combinations of K reference sensors which may be considered from M reference sensor candidates (S560). The active noise control system may determine a subset corresponding to the optimal filter including the best performance (e.g., predicting the smallest error signal) as a subset of reference sensors that are to be used in the active noise control for the target zone, based on the optimal filter determined for each subset or each combination (S562).

As described above, steps S560 to S562 are optional steps. Thus, in various exemplary embodiments of the present disclosure, if the number of entries of the candidate list (i.e., the number of selected reference sensor candidates) reaches a preset number of sensors, the reference sensor candidates may be immediately used in the active noise control.

If the subset of reference sensors used in the active noise control is determined, the active noise control system may initiate the active noise control process including the generation of the noise control signal suitable for cancelling the noise signal using the reference signals received from the determined subset of reference sensors.

If the predetermined control performance level is not achieved using the determined subset of reference sensors after the active noise control process is initiated, the active noise control system may further perform a process (i.e., steps S540 to S544) in which the sensor capable of providing the largest information quantity to the determined subset is selected as the new entry of the subset, thus further increasing the number of entries of the subset. Alternatively, if the optimal filter including the best performance does not achieve a predetermined control performance level (e.g., if the predicted error signal exceeds a predetermined value) in step S550, the process (i.e., steps S540 to S544) may be further performed, so that the number of entries of the candidate list may be further increased.

Although it is described in FIG. 5 that respective processes are sequentially executed, this is merely illustrative of the technical idea of an exemplary embodiment of the present disclosure. In other words, because it is apparent to those skilled in the art that the order described in FIG. 5 may be changed or one or more of the respective processes may be executed in parallel without departing from the essential characteristics of an exemplary embodiment of the present disclosure, the present disclosure is not limited to the time-sequential order of FIG. 5.

Meanwhile, the above-described active noise control method including the reference sensor selection may be performed or implemented by the controller of the active noise control system mounted on the vehicle, such as the controller 220 of FIG. 2. The controller of the active noise control system may be implemented as a digital electronic circuit, an integrated circuit, a field programmable gate array (FPGA), an application specific integrated circuit (ASIC), a digital signal processor (DSP), computer hardware, firmware, software, and/or a combination thereof. All or some functions of the controller of the active noise control system may be implemented by one or more computing devices. For example, the computing device may include one or more processors and a computer-readable storage coupled to the processor and including instructions stored therein, and may be configured to cause the computing device to perform the functions of the active noise control system, when the instructions are performed by the processor.

Figure 6:
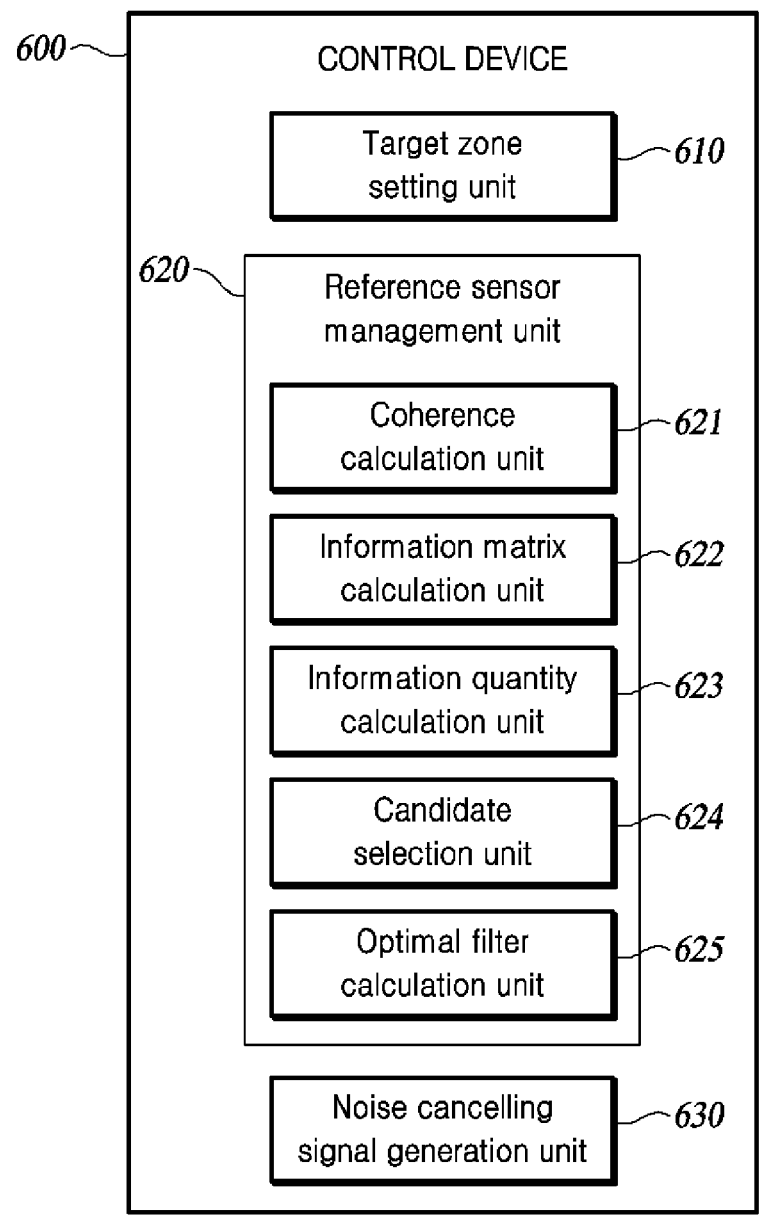
FIG. 6 is a block diagram showing functional components of a control device included in the active noise control system according to an exemplary embodiment of the present disclosure.

FIG. 6 is a block diagram showing functional components of a control device included in the active noise control system according to an exemplary embodiment of the present disclosure.

The control device 600 of the active noise control system according to an exemplary embodiment of the present disclosure may include a target zone setting unit 610, a reference sensor management unit 620, and a noise cancelling signal generation unit 630. It may be understood that the functional components of the control device 600 in FIG. 6 are labeled as . . . units to emphasize their implementation independence. In other implementations, some of the illustrated components may be changed or eliminated, or new components may be added. The control device 600 of FIG. 6 may be included in the controller 220 of FIG. 2 or be implemented as the controller 220.

The target zone setting unit 610 is configured to detect the sitting arrangement of a passenger in the vehicle, and to set at least one target zone in which noise control is required based on the sitting arrangement. The target zone setting unit 610 may determine the sitting state of a passenger in the vehicle using at least one vision sensor that captures the seat or at least one pressure sensor mounted on each seat.

The reference sensor management unit 620 is configured to determine the subset of reference sensors that are to be used in the active noise control for the target zone from the set of a plurality of available reference sensors provided in the vehicle. The reference sensor management unit 620 may determine the subset of reference sensors, which is to be used in the active noise control, by selecting a few reference sensor candidates based on the coherence information quantity among a plurality of reference sensors provided in the vehicle, and applying the optimal filter technique to the selected reference sensor candidates.

Referring to FIG. 6, the reference sensor management unit 620 includes a coherence calculation unit 621, an information matrix calculation unit 622, an information quantity calculation unit 623, a candidate selection unit 624, and an optimal filter calculation unit 625.

The coherence calculation unit 621 is configured to determine the coherence value between the corresponding reference signal and the noise signal, for each of the available sensors, using the coherence function.

The information matrix calculation unit 622 is configured to construct the information matrix for the reference sensor candidate list. The information matrix indicates the coherence information quantity between an indoor noise signal and reference signals corresponding to the reference sensor included in the reference sensor set.

The information quantity calculation unit 623 may determine an additional information quantity to which an associated sensor may additionally provide when added as a new entry to the candidate list, for each of the remaining reference sensors which are not included in the candidate list yet. The additional information quantity may be determined using the coherence value between the reference signal of the associated sensor and the noise signal and the information matrix for the candidate list.

The candidate selection unit 624 may determine the sensor corresponding to the reference signal of the largest coherence value (i.e., closest to 1) among a plurality of reference sensors provided in the vehicle as the first entry (i.e., the first reference sensor candidate) of the reference sensor candidate list. After being selected as the first entry of the reference sensor candidate list, the candidate selection unit 624 repeats a process in which the sensor capable of providing the largest information quantity to the current candidate list among the remaining sensors is added as the new entry of the candidate list, thus selecting a preset number of reference sensor candidates.

The optimal filter calculation unit 625 is configured to perform simulation determining the optimal filter for each of subsets or combinations of reference sensor candidates which may be considered from reference sensor candidates.

The reference sensor management unit 620 may determine the subset corresponding to the optimal filter including the best control performance among the subsets of reference sensor candidates, as the subset of reference sensors that are to be used in the active noise control for the target zone.

The noise cancelling signal generator 630 is configured to generate a noise control signal suitable for cancelling an indoor noise signal using reference signals received from the determined subset of reference sensors, if the subset of reference sensors that are to be used in the active noise control is determined by the reference sensor management unit 620.

Various implementations of devices, units, and methods described herein may be implemented by a digital electronic circuit, an integrated circuit, a field programmable gate array (FPGA), an application specific integrated circuit (ASIC), computer hardware, firmware, software, and/or combinations thereof. These various implementations may include an implementation by one or more computer programs executable on a programmable system. The programmable system includes at least one programmable processor (which may be a special purpose processor or a general purpose processor) coupled to receive and transmit data and instructions from and to a storage system, at least one input device, and at least one output device. The computer programs (also known as programs, software, software applications or code) include instructions for the programmable processor and are stored in a "computer-readable medium".

A computer-readable recording medium includes all types of recording devices in which data readable by a computer system is stored. The computer-readable recording medium may further include a non-volatile or non-transitory medium, such as ROM, CD-ROM, magnetic tape, a floppy disk, a memory card, a hard disk, a magneto-optical disk, or a storage device. Furthermore, the computer-readable recording medium may be distributed in computer systems connected via a network, so that a computer-readable code may be stored and executed in a distributed manner.

Various implementations of systems and techniques described herein may be implemented by the programmable computer. Here, the computer includes a programmable processor, a data storage system (including a volatile memory, a non-volatile memory, other types of storage systems or combinations thereof) and at least one communication interface. For instance, the programmable computer may be one of a server, a network device, a set-top box, an embedded device, a computer expansion module, a personal computer, a laptop, a personal data assistant (PDA), a cloud computing system, or a mobile device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for dynamically changing reference sensors to be used for an active noise control of a vehicle according to a target zone and current noise characteristics, the method comprising:
    obtaining, by a processor, a reference signal indicating vibration introduced from a road from each of sensors provided in the vehicle, and obtaining a noise signal indicating indoor noise from at least one microphone positioned in the target zone in a compartment of the vehicle;
    determining, by the processor, a coherence value between the noise signal and a reference signal corresponding to each of the sensors, and selecting a sensor corresponding to a reference signal with a largest coherence value among the sensors, as a first entry of a candidate list;
    repeating, by the processor, a process in which a sensor adding the largest coherence information quantity to a current candidate list among the sensors is selected as a new entry of the current candidate list, until a number of entries included in the candidate list reaches a preset number;
    setting, by the processor, a reference sensor set which is to be used in the active noise control using sensors included in the candidate list, when the number of the entries included in the candidate list reaches the preset number; and
    generating, by the processor, a noise control signal for the target zone based on reference signals obtained from the reference sensors corresponding to the reference sensor set.

2. The method of claim 1, wherein the process in which the sensor is selected as the new entry of the current candidate list includes:
    construing an information matrix for the current candidate list indicating a coherence information quantity between the noise signal and a reference signal corresponding to each reference sensor included in the current candidate list;
    for each of remaining sensors that are not included in the current candidate list among the sensors, determining a coherence information quantity to be provided to the current candidate list if the remaining sensor is added to the current candidate list as the new entry; and
    adding a sensor, which adds the largest coherence information quantity to the current candidate list, to the current candidate list, thus updating the current candidate list.

3. The method of claim 2, wherein the coherence information quantity added to the current candidate list is determined using a coherence value between the noise signal and the reference signal corresponding to a provided sensor and an information matrix for the current candidate list.

4. The method of claim 1, wherein the reference sensor set which is to be used in the active noise control includes all sensors included in the candidate list.

5. The method of claim 1, wherein the setting of the reference sensor set which is to be used in the active noise control includes:
    determining an optimal filter for each of subsets of sensors which is considered from a set of sensors included in the candidate list; and
    determining a subset of sensors corresponding to the optimal filter including a best control performance among the subsets of the sensors, as the reference sensor set.

6. The method of claim 1, further including:
    selecting, by the processor, a sensor adding the largest coherence information quantity to the reference sensor set among the sensors as the new entry of the reference sensor set, when a predetermined control performance level is not achieved using the reference sensor set.

7. The method of claim 1, further including:
    detecting, by the processor, a sitting state of a passenger in the vehicle to determine a passenger sitting arrangement of the vehicle; and
    determining, by the processor, the target zone based on the passenger sitting arrangement.

8. A control apparatus for dynamically changing reference sensors to be used for an active noise control of a vehicle according to a target zone and current noise characteristics, the control apparatus comprising:
    a memory; and
    at least one processor configured to perform:
        obtaining a reference signal indicating vibration introduced from a road from each of sensors provided in the vehicle, and obtaining a noise signal indicating indoor noise from at least one microphone positioned in the target zone in a compartment of the vehicle;
        determining a coherence value between the noise signal and a reference signal corresponding to each of the sensors, and selecting a sensor corresponding to a reference signal with a largest coherence value among the sensors, as a first entry of a candidate list;

repeating a process in which a sensor adding the largest coherence information quantity to a current candidate list among the sensors is selected as a new entry of the current candidate list, until a number of entries included in the candidate list reaches a preset number;

setting a reference sensor set which is to be used in the active noise control using sensors included in the candidate list, when the number of the entries included in the candidate list reaches the preset number; and generating a noise control signal for the target zone based on reference signals obtained from the reference sensors corresponding to the reference sensor set.

9. The control apparatus of claim 8, wherein the process in which the sensor is selected as the new entry of the current candidate list includes:

construing an information matrix for the current candidate list indicating a coherence information quantity between the noise signal and a reference signal corresponding to each reference sensor included in the current candidate list;

for each of remaining sensors that are not included in the current candidate list among the sensors, determining a coherence information quantity to be provided to the current candidate list if the remaining sensor is added to the current candidate list as the new entry; and adding a sensor, which adds the largest coherence information quantity to the current candidate list, to the current candidate list, thus updating the current candidate list.

10. The control apparatus of claim 9, wherein the coherence information quantity added to the current candidate list is determined using a coherence value between the noise signal and the reference signal corresponding to a provided sensor and an information matrix for the current candidate list.

11. The control apparatus of claim 8, wherein the reference sensor set which is to be used in the active noise control includes all sensors included in the candidate list.

12. The control apparatus of claim 8, wherein the at least one processor is further configured to determine an optimal filter for each of subsets of sensors which is considered from a set of sensors included in the candidate list, and to determine a subset of sensors corresponding to the optimal filter including a best control performance among the subsets of the sensors, as the reference sensor set, when setting the reference sensor set which is to be used in the active noise control.

13. The control apparatus of claim 8, wherein the at least one processor is further configured to select a sensor adding the largest coherence information quantity to the reference sensor set among the sensors as the new entry of the reference sensor set, when a predetermined control performance level is not achieved using the reference sensor set.

14. The control apparatus of claim 8, wherein the at least one processor is further configured to detect a sitting state of a passenger in the vehicle to determine a passenger sitting arrangement of the vehicle, and to determine the target zone based on the passenger sitting arrangement.

15. A computer readable non-transitory recording medium including instructions recorded therein for dynamically changing reference sensors to be used for active noise control of a vehicle according to a target zone and current noise characteristics, wherein, when the instructions are executed by a processor of a computer device, the computer device is configured to perform:

obtaining a reference signal indicating vibration introduced from a road from each of sensors provided in the vehicle, and obtaining a noise signal indicating indoor noise from at least one microphone positioned in the target zone in a compartment of the vehicle;

determining a coherence value between the noise signal and a reference signal corresponding to each of the sensors, and selecting a sensor corresponding to a reference signal with a largest coherence value among the sensors, as a first entry of a candidate list;

repeating a process in which a sensor adding the largest coherence information quantity to a current candidate list among the sensors is selected as a new entry of the current candidate list, until a number of entries included in the candidate list reaches a preset number;

setting a reference sensor set which is to be used in the active noise control using sensors included in the candidate list, when the number of the entries included in the candidate list reaches the preset number; and generating a noise control signal for the target zone based on reference signals obtained from the reference sensors corresponding to the reference sensor set.

16. The computer readable non-transitory recording medium of claim 15, wherein the process in which the sensor is selected as the new entry of the current candidate list includes:

construing an information matrix for the current candidate list indicating a coherence information quantity between the noise signal and a reference signal corresponding to each reference sensor included in the current candidate list;

for each of remaining sensors that are not included in the current candidate list among the sensors, determining a coherence information quantity to be provided to the current candidate list if the remaining sensor is added to the current candidate list as the new entry; and adding a sensor, which adds the largest coherence information quantity to the current candidate list, to the current candidate list, thus updating the current candidate list.

17. The computer readable non-transitory recording medium of claim 16, wherein the coherence information quantity added to the current candidate list is determined using a coherence value between the noise signal and the reference signal corresponding to a provided sensor and an information matrix for the current candidate list.

18. The computer readable non-transitory recording medium of claim 15, wherein the reference sensor set which is to be used in the active noise control includes all sensors included in the candidate list.

19. The computer readable non-transitory recording medium of claim 15, wherein the processor is further configured to determine an optimal filter for each of subsets of sensors which is considered from a set of sensors included in the candidate list, and to determine a subset of sensors corresponding to the optimal filter including a best control performance among the subsets of the sensors, as the reference sensor set, when setting the reference sensor set which is to be used in the active noise control.

20. The computer readable non-transitory recording medium of claim 15,
wherein the processor is further configured to select a sensor adding the largest coherence information quantity to the reference sensor set among the sensors as the new entry of the reference sensor set, when a predetermined control performance level is not achieved using the reference sensor set.

\* \* \* \* \*